United States Patent [19]

Mason

[11] 4,365,934
[45] Dec. 28, 1982

[54] WIND MACHINE

[76] Inventor: H. Carl Mason, 4421 SW. Coast, Lincoln City, Oreg. 97367

[21] Appl. No.: 273,931

[22] Filed: Jun. 15, 1981

[51] Int. Cl.³ .............................................. F03D 7/06
[52] U.S. Cl. ..................................... 416/17; 416/119; 416/197 A
[58] Field of Search .................... 416/197 A, 17, 119, 416/111

[56] References Cited

U.S. PATENT DOCUMENTS

| | | | |
|---|---|---|---|
| 1,283,129 | 10/1918 | Fisher | 416/52 A |
| 1,825,500 | 9/1931 | Banker | 416/52 A |
| 1,850,721 | 3/1932 | Katzenberger | 416/51 A X |
| 3,902,072 | 8/1975 | Quinn | 416/17 X |
| 3,976,396 | 8/1976 | Antogini | 416/119 |
| 4,004,861 | 1/1977 | Soules | 416/119 X |
| 4,032,257 | 6/1977 | Haas | 416/139 A X |

FOREIGN PATENT DOCUMENTS

| | | | |
|---|---|---|---|
| 107483 | 10/1927 | Austria | 416/197 A |
| 2717379 | 10/1978 | Fed. Rep. of Germany | 416/111 |
| 2721450 | 11/1978 | Fed. Rep. of Germany | 416/119 |
| 547871 | 12/1922 | France | 416/119 |
| 2435613 | 5/1980 | France | 446/119 |
| WO80/8590 | 3/1980 | PCT Int'l Appl. | 416/17 |

*Primary Examiner*—Everette A. Powell, Jr.
*Attorney, Agent, or Firm*—Kolisch, Hartwell & Dickinson

[57] ABSTRACT

A wind-driven machine having a hollow shell body supported on an upright rotatably mounted mast. The shell body is formed by multiple elongate shell segments circumferentially distributed about the mast. The shell segments are pivotally mounted for pivotal movement between closed and open positions.

6 Claims, 6 Drawing Figures

U.S. Patent  Dec. 28, 1982  Sheet 1 of 2  4,365,934
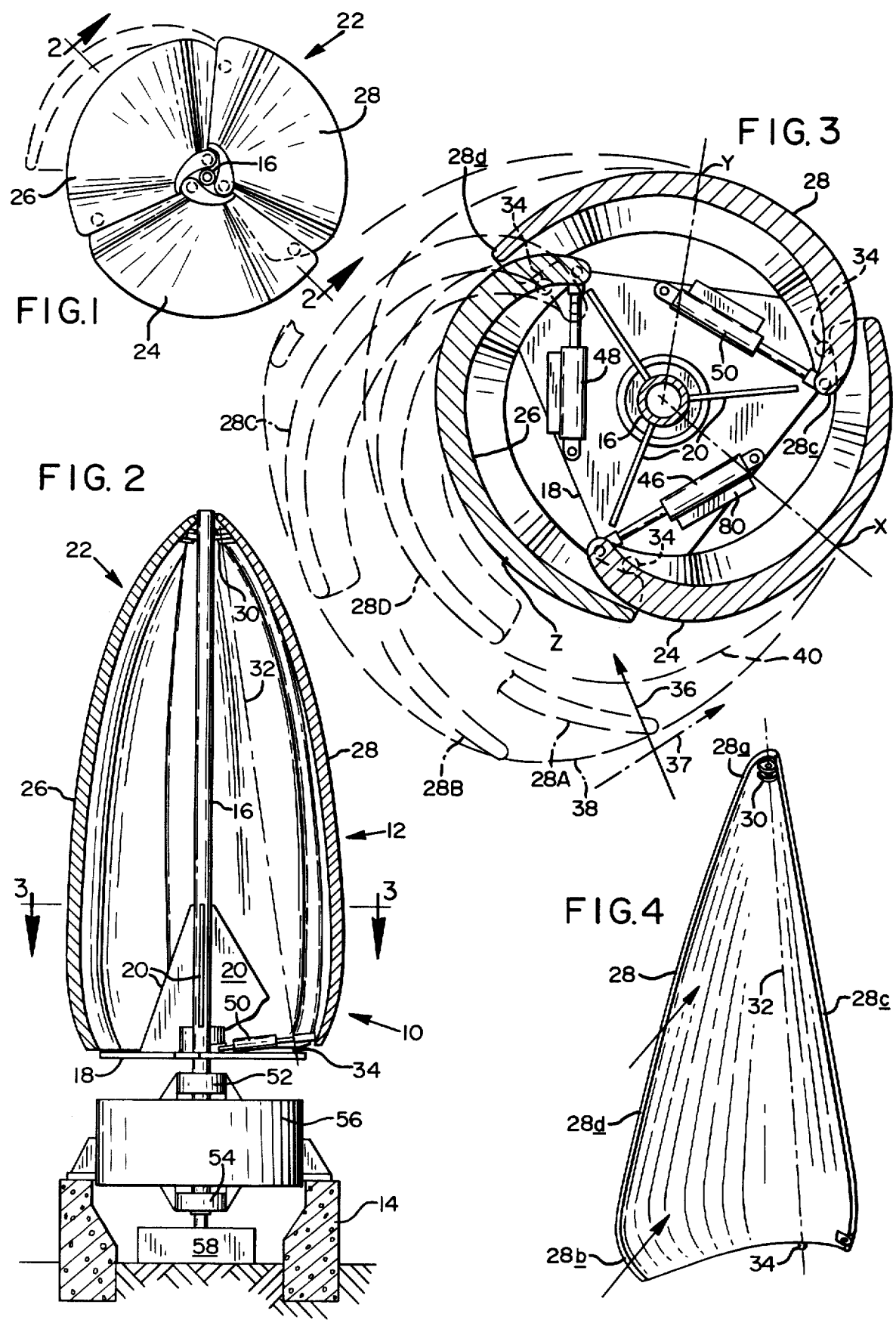

WIND MACHINE

BACKGROUND AND SUMMARY

This invention relates to a wind-driven machine of the type that may be utilized to harness the power of the wind and convert the kinetic energy posessed by a moving air mass into another form of energy which conveniently might be electrical energy.

With the world's supply of fossil fuels being limited and the availability of such fuels becoming increasingly restricted, more and more interest has been directed to the use of non-depletable energy sources to provide sources of power. The power of the wind constitutes a significant part of available non-depletably sources.

Various types of wind-propelled devices have been proposed in the past. These have included wind mills, various types of paddle constructions, and propeller type devices. While many of such units have operated satisfactorily under ordinary wind conditions, wind propulsion devices known to date have been characterized by a number of disadvantages. Some devices for instance, while operating satisfactorily under moderate wind conditions, are not able to withstand winds at high velocity. Devices which are moderately efficient at winds of a certain level, may have efficiencies which drop off sharply at velocities below or above that level. To produce optimum results, wind driven devices should be rapidly responsive to changes in wind direction and velocity, characteristics not commonly shared by prior art devices. With propeller type devices, noise can be a major problem, particularly at high wind velocities. Optimumly, and with electrical generating wind-driven devices, such devices should be sensitive to load requirements and RPM limitations.

A general object of this invention is to provide a unique wind-driven machine featuring adjustable vanes or shell segments in an impeller which are readily adjusted in response to changes in wind direction, wind velocity, load, etc. to produce optimum turning movement in the impeller in response to the wind driving force.

Another object is to provide a wind-driven machine featuring adjustable shell segments or vanes shaped in such a manner as to produce highly efficient conversion of the kinetic energy of the wind to rotary motion producing power.

The wind-driven machine of the invention is highly flexible in operation and effective to harness the power of the wind whether such is moving at low or high velocities. The machine is rapidly responsive to changes in wind direction and wind velocity.

The apparatus contemplated, in a preferred embodiment of the invention, features multiple, elongate curved shell segments or vanes pivotally mounted on a central upstanding support, which may be adjusted under high velocity wind conditions to occupy a closed position where the segments form a hollow shell surrounding the support of elongate ovate configuration. In such a condition of adjustment, the exposed parts of the machine offer minimal resistance to the passage of wind therearound, and thus the machine is capable of withstanding extremely high wind velocities without destruction. From such closed positions, the vanes or shell segments may be adjusted to various degrees of openness, to provide an effective instrumentality for capturing the wind to provide rotary motion in the device. The design of the impeller portion of the machine, taking the form as it does of an elongate slim instrumentality projecting up into the air, is such that a multiplicity of the units may be mounted relatively closely adjacency in a confined space, without operation of the various units interfering with each other.

These and other objects and advantages are obtained by the invention, which is described hereinbelow in conjunction with the accompanying drawings, wherein:

FIG. 1 is a view looking downwardly at the top of an impeller unit in a machine as contemplated herein, and illustrating in dashed outline the position of a vane or shell segment with such shifted from a closed to a partially open position.

FIG. 2 is a cross-sectional view, taken generally along the line 2—2 in FIG. 1;

FIG. 3 is a cross-sectional view, taken generally along the line 3—3 in FIG. 2, and further illustrating in dashed outlines how a shell segment or vane can be shifted from a closed to a partially open or fully open position and then closed with rotation of the support for the shell segment;

FIG. 4 is a perspective view illustrating one of the shell segments in the device illustrated in FIGS. 1 through 3;

A DETAILED DESCRIPTION OF A PREFERRED EMBODIMENT OF THE INVENTION

Figure 5:
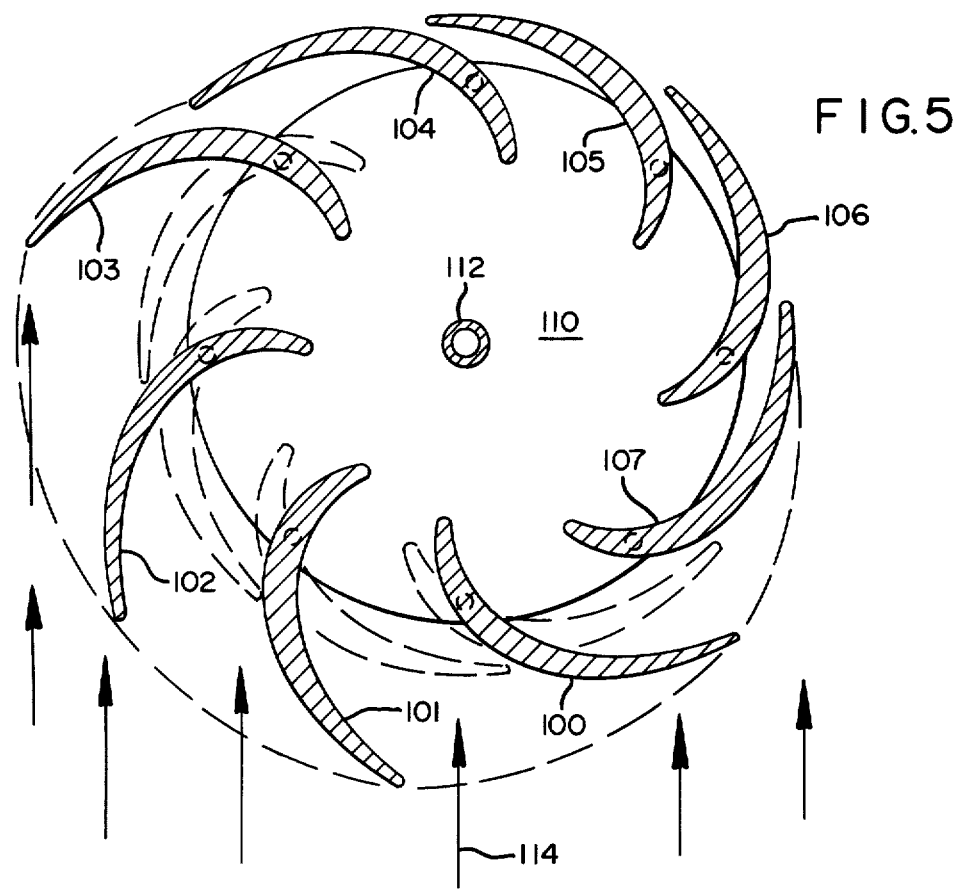
FIG. 5 is a cross-sectional view, similar to FIG. 3, but illustrating a modified form of construction.

Referring now to the drawings, and first of all more particularly to FIGS. 1 through 4, a wind-driven machine as contemplated by this invention is shown generally at 10. Such includes an impeller 12 located above the ground and projecting upwardly into the air. Mounting the impeller and associated structure on the ground is a foundation 14.

The impeller takes the form of an elongate upright mast 16. Suitably secured to the mast, adjacent the lower portion thereof, is a horizontal platform or table 18. Adding strength to the mast and platform assembly are gussets 20 secured to the mast and platform.

The mast and platform constitute an internal support for a hollow shell body, generally shown at 22, substantially encompassing the upper portion of the mast. The hollow shell body 22, as perhaps best illustrated in FIG. 2, has generally the shape of an elongate cone positioned with the longitudinal axis thereof upright and corresponding to the axis of mast 16. More specifically, the cone has an elongate ovate shape, with the sides of the shell body curving outwardly and downwardly progressing downwardly from the top of the shell body. The upper end of the shell body is approximately rounded, and located adjacent the top of the mast. The bottom end of the shell body has a substantially greater diameter than the upper end.

The shell body is formed by multiple shell segments or vanes circumferentially distributed about the axis of mast 16. In the modification of the invention shown in FIGS. 1 through 4, three of such shell segments are provided, and such are indicated at 24, 26, and 28. Each shell segment takes the form of an elongate element, having an upper end, as demonstrated by end 28a of relatively narrow width, and a lower end, as demonstrated by end 28b, of substantially greater width. Each shell segment, when mounted in place, in longitudinal cross section, curves outwardly and downwardly progressing from the top end thereof. In transverse cross section, the shell segment is also curved, with the concave side thereof facing inwardly and the convex side thereof facing outwardly. As illustrated in FIG. 3, the curvature of inner and outer sides of a shell segment progressing from the leading edge 28c thereof to the trailing edge 24d is not uniform, the curvature of the surfaces being over a gradually increasing radius. Preferably, the curvature of a shell segment adjacent its bottom end and in longitudinal cross section, is slightly inwardly and toward the central mast, to provide a cupping action in catching the wind.

The shell segments or vanes are pivotally mounted on the support structure comprising the central mast and platform, each for pivotal movement about an axis extending from adjacent the top to adjacent the bottom of the shell segment. Specifically, and with reference to shell segment 28, such is pivotally mounted adjacent its upper or top end on lug 30 projecting outwardly from the mast for pivotal movement about axis 32. The shell segment is pivotally mounted adjacent its bottom end by pin 34 for pivotal movement about axis 32. Axis 32 about which the shell segment pivots is inclined to the axis of mast 16, so as to be closer to the mast adjacent the top of the shell segment then adjacent the bottom of the shell segment.

The various shell segments are shown in FIG. 1 in a closed position, where the shape of the cone is generated. During operation of the wind-driven machine, the mast and platform rotate about the axis of the mast, and each shell segment, during part of one revolution of the mast and platform, is shifted outwardly from its closed position to provide an element which the wind acts against to produce rotation of the impeller, and thence inwardly to return to a closed position. Thus, and with reference to FIG. 3, and assuming a wind direction, as indicated by the arrow 36, during rotation of the mast and platform, and on the trailing edge of a shell segment reaching approximately the position indicated at X, pivotal movement of a shell segment may be started, to cause the shell segment to swing toward an open position with continued rotation of the mast. The shell segment returns to a closed position on its trailing edge reaching the position indicated at Y. Assuming conditions wherein it is desired to harness as fully as possible the power of the wind, i.e. light wind conditions, heavy load demand, etc., outward movement of a shell segment is to its fully open position as indicated by the dashed outlines of the shell segment given reference numerals 28A, 28B and 28C. Outward and inward movement of the shell segment may take place, as indicated in FIG. 3, throughout approximately 240° rotation of the mast, with the outline shown at 38 indicating the path of the trailing edge of a shell segment during such 240° movement. During conditions when it is desired to harness less of the wind movement, a shell segment during this 240° degree movement of the mast is pivoted outwardly to only a partially open position, as indicated by the dashed outline of the shell segment shown at 28D. Dashed outline 40 shows the path of the trailing edge of a shell segment during 240° movement of the mast when the segment is only partially opened.

Pivotal movement of successive shell segments from closed, toward open, and then into a closed position may take place with the mast and table 18 rotating throughout other angles than the 120° angle just described. Such may take place, for example, with the mast rotating over 180° angle, or over an angle of 300°. Efficiency measurements made at a particular installation will determine the optimum amount of angular movement in the mast to effect opening and closing of a shell segment. When a particular shell segment starts to open is determined by wind direction. Thus, with a wind direction as shown by the arrow 37 which indicates a 90° shift in wind direction, and in an installation where opening and closing occurs over 240° rotation of the mast, then opening of a segment does not occur until its trailing edge reaches the position indicated at Z.

Pivotal movement of the various shell segments during rotation of the mast from closed to open positions may be produced by a number of means. In the particular embodiment of the invention shown, such is produced by fluid-operated piston-cylinders or servo motors 46, 48, 50 interposed between the leading edges of the respective shell segments and the platform or table 18.

The bottom end of mast 16 may be rotatably supported for rotation about the axis thereof, as by bearings 52, 54 secured to framework 56 supported on foundation 14. Power-generating means such as an electrical generator housed within this framework is connected to the mast to be driven with rotation of the mast. Shown at 58 in FIG. 2 is a central processing unit. An extension of the mast is connected with the central processing unit, whereby the unit is fed information as to the rotational position of the mast.

Figure 6:
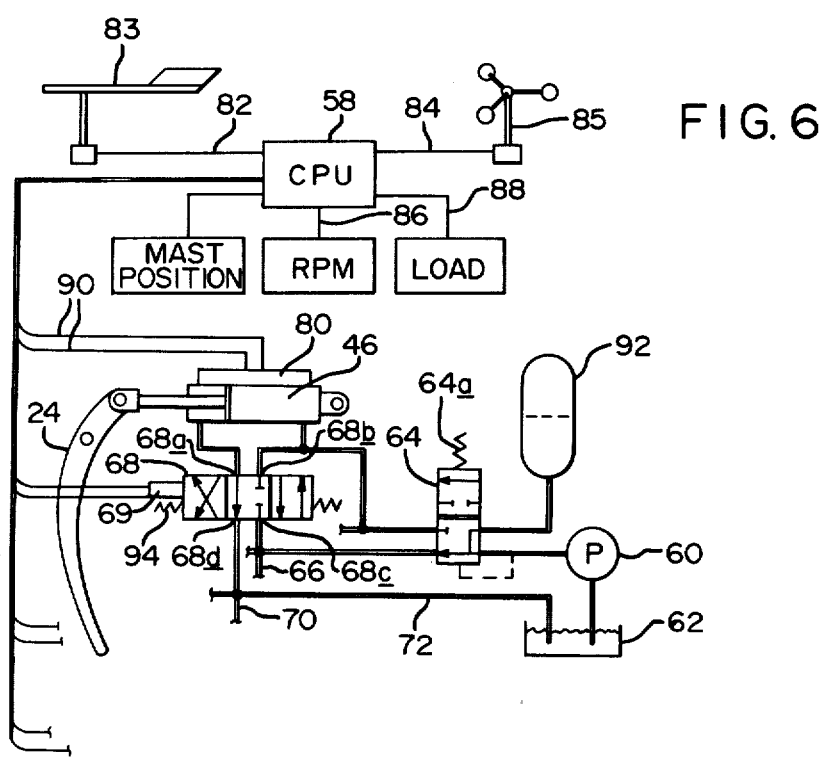
FIG. 6 is a schematic view illustrating a means for controlling the adjusted positions of shell segments in an impeller as contemplated.

Illustrated schematically in FIG. 6 is a suitable control means such as may be utilized in controlling fluid flow to motors 46, 48, 50 and producing desired adjustment in the shell segments or vanes between a closed and partially opened or fully opened positions, in responce to wind velocity, wind direction, load, RPM requirements, etc. While a particular control means is illustrated, it should be understood that a number of different systems may be employed, and the system disclosed is only exemplary of one that might be used.

Referring to FIG. 6, a pump is illustrated at 60, having its intake side connected to a reservoir 62. The discharge side of the pump passes through a pilot-operated safety valve 64 and connects to a pressure fluid supply conduit 66 which supplies pressure fluid to fluid-operated piston cylinders or servo motors 46, 48, 50. In FIG. 6, only one of such servo motors is shown, i.e. piston cylinder 46, but it should be understood that connections to the other piston cylinders are like those disclosed for piston cylinder 46.

Shown at 68 is a servo valve which is opened and closed in response to valve control 69. Valve 68 has three positions, i.e. a neutral position, where ports 68c, and 68b are blocked off from each and ports 68a, 68d communicate. In another position to one side of the neutral position, ports 68a, 68c communicate, and ports 68b, 68d communicate. In another position, on the other side of this neutral position, ports 68a, 68d communicate, and ports 68b, 68c communicate.

Port 68d connects to a conduit 70 which is an exhaust fluid conduit and is connected to reservoir 62 through conduit 72. Port 68c connects with pressure fluid supply conduit 66. Port 68b connects with conduit 74 joining with one end of piston cylinder 46. Port 68a connects with the opposite end of piston cylinder 46.

Shown at 80 is an encoder for piston cylinder device 46 which produces a coded signal representative of the position of the piston within the cylinder.

Central processing unit 58 earlier discussed, in addition to being supplied information relative to mast position, is also supplied information relative to wind direction by a wind direction sensor 83 through a conductor 82, information relative to wind velocity by velocity sensor 85 through a conductor 84, information relative to the RPM of the generator through conductor 86, and information relative to load through conductor 88. Information relative to the position of the piston within the piston cylinder is supplied to the central processing unit from the encoder through conductors 90, 92.

With the system described, the central processing unit supplies control signals to valve control 69, producing actuation of the valve as required to produce proper extension or contraction of piston cylinder device 46. Contraction of the device occurs with positioning of the valve to connect port 68a with port 68c. Extension of the device occurs with connection of port 68c to port 68b.

An accumulator is shown at 92 which collects fluid under pressure from pump 60 during normal operation of the unit. Should there be a power failure and malfunctioning of the pump, safety valve 64 is biased by spring 64a to a position where the contents of the accumulator is supplied to piston cylinder device 46, causing it to extend and with closing of the vane controlled by the device. Springs 94 in servo valve 68 adjust the valve to its neutral position which provides for the exhaust of fluid from the opposite end of the piston cylinder device. By this construction, should there be a power failure, provision is made for the various vanes to move to their closed position.

FIG. 5 illustrates a modified form of the invention, wherein, instead of three shell segments making up the hollow shell, eight different shell segments are provided, indicated at 100 through 107. These are pivotally mounted on platform or table 110 and surround a central upright mast 112. Although not illustrated in the drawings, it should be understood that upper ends of these shell segments are pivotally supported on the upper extremity of the mast, as explained in the modification of the invention illustrated in FIGS. 1 through 4. Means may also be provided for swinging the shell segments between closed and partially or fully opened positions as described in connection with the first modification of the invention described herein. As illustrated in FIG. 5, with the wind blowing in the direction of arrows 114, as the mast and platform rotate a shell segment starts to swing to an open position on the shell segment reaching the shell segment 107 and returns to a closed position on reaching approximately the position of shell segment 106.

With continued reference to FIG. 5, with shell segments in the positions indicated for segments 102 and 103, inner concave surfaces of the segments tend to catch the wind urging the table and the mast to rotate in a clockwise direction. With a shell segment in the position of segment 101, an air foil type of action is produced, with wind on moving past the shell segment tending to produce a low pressure condition on the concave side of the shell segment, producing a force urging rotation of the mast and table in a clockwise direction. Shell segments moving into the wind, such as segment 106, since such are positioned in a closed position, offer minimal resistance to wind flow over their outer surfaces.

It should be apparent that the wind-driven machine of the invention can readily handle widely different wind velocities. On extremely high wind velocities, the segments may all be shifted to a closed position, to offer minimal resistance to the passage of wind across the unit. The machine readily responds to variables such as changes in load, wind direction, etc, through proper adjustments made in when the shell segments open and the extent to which such open as the impeller rotates. It should also be apparent that with the construction of the invention, a cluster of units may readily be mounted in a relatively confined space, without interference in the operation of the various units.

While embodiments of the invention have been described herein, it should be obvious that variations and modifications are possible without departing from the invention.

It is claimed and desired to secure by Letters Patent:

1. A wind-driven machine comprising:
   an elongate hollow shell body disposed with the longitudinal axis thereof in an upright position, said body being shaped as a rounded cone and having the smaller diameter end thereof located over its larger diameter end,
   an internal support for said shell body and means rotatably supporting the base of said support for rotation about an axis corresponding to the longitudinal axis of the body,
   power-generating means connected to and driven by said support,
   said hollow shell body being formed by plural elongate shell segments which follow one another in a direction extending circumferentially of the body and each segment extending from adjacent the top end to adjacent the bottom end of said body, each shell segment in longitudinal cross section curving outwardly and downwardly progressing downwardly from the top end thereof and in transverse cross section having a concave side facing inwardly and a convex side facing outwardly, each shell segment having leading and trailing edges and being pivotally mounted for pivotal movement about an axis extending adjacent the trailing edge thereof from adjacent the top to adjacent the bottom of the shell segment between a closed position where the segment imparts part of the cone shape of the body and an open position where the trailing edge of the shell segment moves outwardly and the segment is disposed transversely of its closed position, an opening existing along the leading edge of the shell segment between the leading edge and said support with the segment moved from its closed position, and
   means for producing pivotal movement of said segments rotated to rotational movement of said support.

2. The machine of claim 1, wherein said internal support for said shell body comprises an upright mast extending along the longitudinal axis of the shell body, and said shell segments are pivotally mounted by means secured to said mast, the interior of said shell body being essentially open save for said mast.

3. The machine of claim 1, wherein the shell body has an elongate ovate shape with sides that curve outwardly and downwardly progressing downwardly from the top end of the shell body for a major portion of the length of the shell body, and the pivot axes of the shell segments are inclined so as to be closer to the longitudinal axis of the shell body adjacent the top of the body then adjacent the bottom of the body.

4. The machine of claim 1, wherein the shell body has an elongate ovate shape with sides that curve outwardly and downwardly progressing downwardly from the top end of the shell body for a major portion of the length of the shell body, said internal support for said shell body comprises an upright mast extending along the longitudinal axis of the shell body, the shell segments are pivotally mounted by means secured to said mast, the pivot axes of the shell segments are inclined so as to be closer to the longitudinal axis of the shell body adjacent the top of the body then adjacent the bottom of the body, and the interior of the shell body is essentially open save for said mast.

5. A wind-driven machine comprising:

an upright central support, and means rotatably mounting said support for rotation about an upright axis, power-generating means operatively connected to and driven by said support, and multiple elongate curving vanes distributed about said support having upper ends of reduced width adjacent the top of said support and bottom ends of greater width in a region spaced downwardly from said top end of the support, said vanes following one another in a direction extending circumferentially of said support, each vane in longitudinal cross section curving outwardly and downwardly progressing downwardly for a major portion of the length of the vane from the top end of the vane and each vane having a leading and a trailing edge and in transverse cross section progressing from its leading to its trailing edge having inner and outer surfaces curving with gradually increasing radius, pivot means pivotally mounting said vanes for pivotal movement about axes disposed adjacent the leading edges of the vane and extending from adjacent the top to adjacent the bottom of the vanes, said vanes having closed positions and in their closed positions collectively defining a hollow cone-shaped shell body disposed about the support which shell body progressing downwardly from the top thereof has increasing diameter, each vane being pivotable about its pivot axis to an open position where the trailing edge of the vane moves outwardly and the vane extends transversely of the position occupied in a closed position, an opening existing along the leading edge of the vane between the leading edge and said support with the vane moved from its closed position and means for producing pivotal movement of said vanes related to rotational movement of said support.

6. The wind-machine of claim 5, wherein the vanes are disposed in their closed positions with the trailing edge of a vane outwardly of and overlying the leading edge of a circumferentially following vane.

* * * * *